Patented Apr. 2, 1946

2,397,630

UNITED STATES PATENT OFFICE 2,397,630

DICHLOROFORMATE PREPARATION

Franklin Strain, Norton Center, Ohio, assignor to Pittsburgh Plate Glass Company, Pittsburgh, Pa., a corporation of Pennsylvania No Drawing. Application April 2, 1943, Serial No. 481,596

1 Claim. (Cl. 260—463)

This invention relates to a new method of preparing polyhaloformates of glycols. These compounds have previously been prepared by first preparing addition compounds of phosgene and tertiary bases and subsequently reacting the addition compound with the glycol. The reaction by the phosgene and the glycol has been undertaken, but the results reported have indicated that the resulting product was the cyclic carbonate of glycol having the structure:

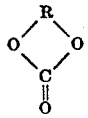

This result is to be expected when the glycol contains fewer than five carbon atoms between the hydroxyl groups. Thus, a compound containing three carbon atoms between the hydroxyl groups will form a six membered ring structure which is a very stable type of ring structure. Ring structures having seven or eight members are also quite stable.

The invention is particularly applicable to the preparation of diprimary glycols such as ethylene glycol, trimethylene glycol, tetramethylene glycol, etc., the disecondary glycols such as 2,3-butylene glycol, 2,4-hydroxy n-pentane, etc., and the primary-secondary glycols such as 1,2-propylene glycol, 1,3-butylene glycol, etc.

The dihaloformates, otherwise known as dihalocarbonates, will have the structure:

$$\text{X}-\overset{\text{O}}{\underset{\|}{\text{C}}}-\text{O}-\text{R}-\text{O}-\overset{\text{O}}{\underset{\|}{\text{C}}}-\text{X}$$

in which R represents a divalent alkylene group and X represents a halogen atom. The dihaloformates of the glycols are generally colorless liquids which are insoluble in water and soluble in organic solvents such as ether, acetone, and alcohol. They are quite stable for long periods of time if prepared in anhydrous condition.

The new method consists in introducing gaseous or liquid phosgene into the liquid glycol while maintaining a low temperature by refrigeration. The reaction is strongly exothermic, and if the reaction is conducted rapidly, the temperature may rise to 60° C. or even to 80° C. By passing the phosgene into the glycol very slowly extreme temperatures may be avoided, but even then, temperatures of 40° to 50° C. are not uncommon. Under such conditions of operation the only carbonate produced will be the cyclic form. By cooling moderately, it was found that dichloroformates are produced directly in substantial yields. Excellent yields may be produced by extreme refrigeration. There is a practical limitation on the extent of cooling due to the fact that phosgene becomes liquid at 8° C. At the lower temperatures, however, the rate of reaction is retarded so as to make it undesirable to operate at temperatures below 15° C. Accordingly, the optimum temperature of operation has been found to be between 15° C. and 25° C'. The following examples are illustrative of the new method:

Example I 25 moles of phosgene were passed into 10 moles of ethylene glycol at a rate of 100 millimoles per minute and at a temperature below about 20° C. The reaction mixture was warmed to 35° C. and evacuated for several minutes by means of a vacuum pump to remove excess phosgene. The reaction mixture was washed four times with water and dried over calcium chloride, whereby the dichloroformate of ethylene glycol was obtained. This compound was a colorless liquid having a density

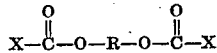

of 1.456.

Example II

Fifteen hundred grams of 1,2-propylene glycol were placed in a three liter flask provided with a stirring mechanism, a thermometer and a tube leading to a point below the liquor level. The flask was submerged in a freezing mixture of salt and ice and cooled to about +5° C. Phosgene was passed into the tube and bubbled through the glycol. The rate of addition was controlled to prevent the temperature from rising above +20° C. throughout the entire reaction. At first the rate of addition was quite slow but towards completion it was possible to increase the rate without exceeding 20° C. The reaction was complete in about two hours. The product was washed with water and dried over calcium chloride. A 65% yield of 1,2-propylene dichloroformate was obtained.

Example III

An 8" glass lined steel tower, packed with porcelain rings was used to prepare ethylene glycol bis chloroformate by a continuous process. The glycol passed down the tower over the rings and gaseous phosgene entered at a rate 50% in excess of stoichiometric proportions, near the bottom. The tower was cooled to about 15° C. by circulating refrigerated brine through a cooling jacket. The chloroformate found was continuously withdrawn from the base of the tower and recovered. About 85% yield was obtained.

Example IV

The procedure of Example II was repeated using trimethylene glycol. A 70% yield of 1,3-propylene dichloroformate was obtained.

I claim:

A continuous method of preparing a glycol dichloroformate which comprises introducing a stream of gaseous phosgene into a gas-liquid contact tower at a low level therein, introducing a stream of a glycol selected from the group consisting of diprimary, disecondary and primary secondary glycols into said tower at a level above the level of introduction of phosgene to establish a zone of counter current contact therewith, regulating the rate of flow of phosgene to that of glycol so as to maintain a stoichiometric excess of phosgene in said tower, maintaining the temperature in the contact zone in said tower between 15° C. and 25° C., continuously withdrawing unreacted phosgene as an overhead, continuously withdrawing chloroformate from the base of the tower and recovering said chloroformate.

FRANKLIN STRAIN.